(12) United States Patent
Smith et al.

(10) Patent No.: US 12,198,120 B2
(45) Date of Patent: Jan. 14, 2025

(54) AUTOMATED DELIVERY SYSTEM FOR BRICK AND MORTAR RETAIL LOCATIONS

(71) Applicant: Swyft, Inc., San Francisco, CA (US)

(72) Inventors: Lincoln Smith, San Francisco, CA (US); Gower Smith, San Francisco, CA (US)

(73) Assignee: Swyft Inc., San Francisco, CA (US)

( * ) Notice: Subject to any disclaimer, the term of this patent is extended or adjusted under 35 U.S.C. 154(b) by 354 days.

(21) Appl. No.: 16/893,363

(22) Filed: Jun. 4, 2020

(65) Prior Publication Data
US 2020/0387857 A1    Dec. 10, 2020

Related U.S. Application Data

(60) Provisional application No. 62/857,245, filed on Jun. 4, 2019.

(51) Int. Cl.
| | |
|---|---|
| *G06Q 20/18* | (2012.01) |
| *G06F 21/31* | (2013.01) |
| *G06Q 10/0836* | (2023.01) |
| *G06Q 10/087* | (2023.01) |
| *G06Q 20/40* | (2012.01) |
| *G06Q 30/0601* | (2023.01) |
| *G07C 9/37* | (2020.01) |

(52) U.S. Cl.
CPC ............. *G06Q 20/18* (2013.01); *G06F 21/31* (2013.01); *G06Q 10/0836* (2013.01); *G06Q 10/087* (2013.01); *G06Q 20/40145* (2013.01); *G06Q 30/0633* (2013.01); *G06Q 30/0639* (2013.01); *G07C 9/37* (2020.01); *G05B 2219/40233* (2013.01)

(58) Field of Classification Search
None
See application file for complete search history.

(56) References Cited

U.S. PATENT DOCUMENTS

| | | | |
|---|---|---|---|
| 6,535,790 B2 | 3/2003 | Nakano | |
| 9,111,313 B2 | 8/2015 | Chirnomas | |
| 9,430,788 B2 | 8/2016 | Stiernagle | |
| 9,636,825 B2 | 5/2017 | Penn | |
| 2003/0233165 A1* | 12/2003 | Hein | G06Q 10/087 |
| | | | 700/215 |
| 2013/0024232 A1* | 1/2013 | Powell | G06Q 30/06 |
| | | | 705/26.62 |

(Continued)

FOREIGN PATENT DOCUMENTS

| | | |
|---|---|---|
| CN | 206011103 U | 3/2017 |
| WO | 01/13342 | 2/2001 |

OTHER PUBLICATIONS

PCT International Search Report and Written Opinion in International Application PCT/US18/50524, mailed Jan. 15, 2019, 14 pages.

(Continued)

*Primary Examiner* — Fateh M Obaid
(74) *Attorney, Agent, or Firm* — Toering Patents PLLC

(57) ABSTRACT

This application describes an automated inventory detection, retrieval and delivery system for traditional brick and mortar retail locations. The automated inventory detection, retrieval and delivery system may be retrofitted to existing brick and mortar retail locations to enable contactless ordering and retrieval of items.

18 Claims, 6 Drawing Sheets

(56) References Cited

U.S. PATENT DOCUMENTS

| | | | | |
|---|---|---|---|---|
| 2014/0100964 | A1* | 4/2014 | Kramer | G06Q 30/02 |
| | | | | 705/14.66 |
| 2014/0330603 | A1* | 11/2014 | Corder | G05B 15/02 |
| | | | | 705/7.12 |
| 2017/0121113 | A1 | 5/2017 | Wagner | |
| 2017/0223017 | A1* | 8/2017 | Kohli | H04L 63/0853 |
| 2017/0242438 | A1 | 8/2017 | Chan | |
| 2017/0355511 | A1* | 12/2017 | Akdogan | A61J 7/0076 |
| 2018/0046982 | A1* | 2/2018 | Li | G06Q 30/0639 |
| 2018/0048728 | A1* | 2/2018 | Paul | H04L 67/52 |
| 2018/0130017 | A1* | 5/2018 | Gupte | G01N 33/00 |
| 2018/0204177 | A1* | 7/2018 | Ferla | G06Q 10/0833 |
| 2020/0082369 | A1 | 3/2020 | Smith | |
| 2020/0218865 | A1* | 7/2020 | Wagner | G05B 19/124 |
| 2020/0387881 | A1 | 12/2020 | Smith | |

OTHER PUBLICATIONS

PCT International Preliminary Report on Patentability in International Application PCT/US18/50524, mailed Mar. 26, 2020, 8 pages.

Solebox Berlin Opening with Patrick Mohr meets Reebok Classic (solebox), Jul. 16, 2014, online at: https://www.youtube.com/watch?v=WI_I0gfBUbw, entire video, especially demonstration at 0:16-0:24.

* cited by examiner

AUTOMATED DELIVERY SYSTEM FOR BRICK AND MORTAR RETAIL LOCATIONS

CROSS-REFERENCE TO RELATED APPLICATION

This applications claims priority to U.S. Provisional Patent Application No. 62/857,245 filed on Jun. 4, 2019 and titled "Mechanical Transfer From Vending Machine to Robot Retrofit Kit For Traditional Retail Stores That Provides An Automated Delivery System Methods and Processes For Wireless Payments On An Automated Unattended Self-Service Vending Kiosk System", the entire disclosure of which is hereby incorporated by reference in its entirety.

BACKGROUND

While shopping in traditional brick and mortar retail stores is seen by many as a favorite pastime, individuals are now seeking cheaper and more convenient ways to purchase items. In some instances, vending machines or dispensing machines are provided airports, malls, hotels and other locations to provide individuals with some measure of convenience. However, the number of items available at these vending machines is somewhat limited. Additionally, individuals do not know what items are or aren't in stock at these vending machines until they arrive at the vending machines.

SUMMARY

The present application describes an automated inventory detection, retrieval and delivery system for traditional brick and mortar retail locations. In some examples, various components and systems of the automated inventory detection, retrieval and delivery system may be retrofitted to existing brick and mortar retail locations and/or other locations such as apartment complexes, airports, train/subway stations, hotels, college campuses and so on.

Additionally, the automated inventory detection, retrieval and delivery system may be substantially or completely autonomous. As such, individuals visiting traditional brick and mortar retail locations can avoid contact and/or interactions with other individuals due to pandemics, personal preferences or other reasons.

The automated inventory detection, retrieval and delivery system also tracks in real-time or substantially real-time, available inventory for various items in the brick and mortar retail location. Thus, when an individual accesses the system to order various items, the individual can know with a certainty that the particular item she ordered is available and may be picked up at her convenience.

Accordingly, the present application describes a method for contactless delivery of an item at a brick and mortar retail location. In some examples, the method includes receiving, from a computing device, a request for an item, the item being physically located within the brick and mortar retail location. In response to receiving the request for the item, causing a robotic delivery system associated with the brick and mortar retail location to retrieve the item and place the item in a delivery compartment. Inventory information associated with the item is automatically updated in real-time or substantially real-time. In some examples, the inventory information indicates the item is no longer available for purchase although the item is physically located within the brick and mortar retail location. The method also includes receiving, from the computing device, authentication information verifying an identity of an individual associated with the request. Once the identity of the individual is verified, the item is released from the delivery compartment. The inventory information associated with the item is then verified in response to the item being released from the delivery compartment.

Also described is a system comprising a processor and a memory. The memory is communicatively coupled to the processor and stores instructions that, when executed by the processor, perform operations. These operations include receiving, from a computing device, a request for an item, the item being physically located within the brick and mortar retail location. In response to receiving the request for the item, causing a robotic delivery system associated with the brick and mortar retail location to retrieve the item and causing the robotic delivery system to place the item in a secure delivery compartment. In response to the robotic delivery system retrieving the item or placing the item in the secure delivery compartment, automatically updating, in substantially real-time, inventory information associated with the item. In some examples, the inventory information indicates the item is no longer available for purchase although the item is physically located within the brick and mortar retail location. Authentication information may be used to verify an identity of an individual associated with the request. Once the identity of the individual is verified, the item may be released from the delivery compartment. The inventory information associated with the item is then verified in response to the item being released from the delivery compartment.

The present application also describes a processor and a memory communicatively coupled to the processor. The memory stores instructions that, when executed by the processor, perform operations. These operations may include storing inventory information associated with an item physically available at a brick and mortar retail location. The system may receive a request for the item. A robotic delivery system associated with the brick and mortar retail location retrieves the item and places the item in a secure delivery compartment associated with the brick and mortar retail location. The inventory information associated with the item is then automatically updating, in substantially real-time. In some examples, the inventory information indicates the item is no longer available for purchase although the item is physically located within the brick and mortar retail location. Authentication information verifying an identity of an individual associated with the request is received and the system enables access to the delivery compartment in response to receiving the authentication information. Inventory information associated with the item is verified in response to the item being removed from the delivery compartment.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
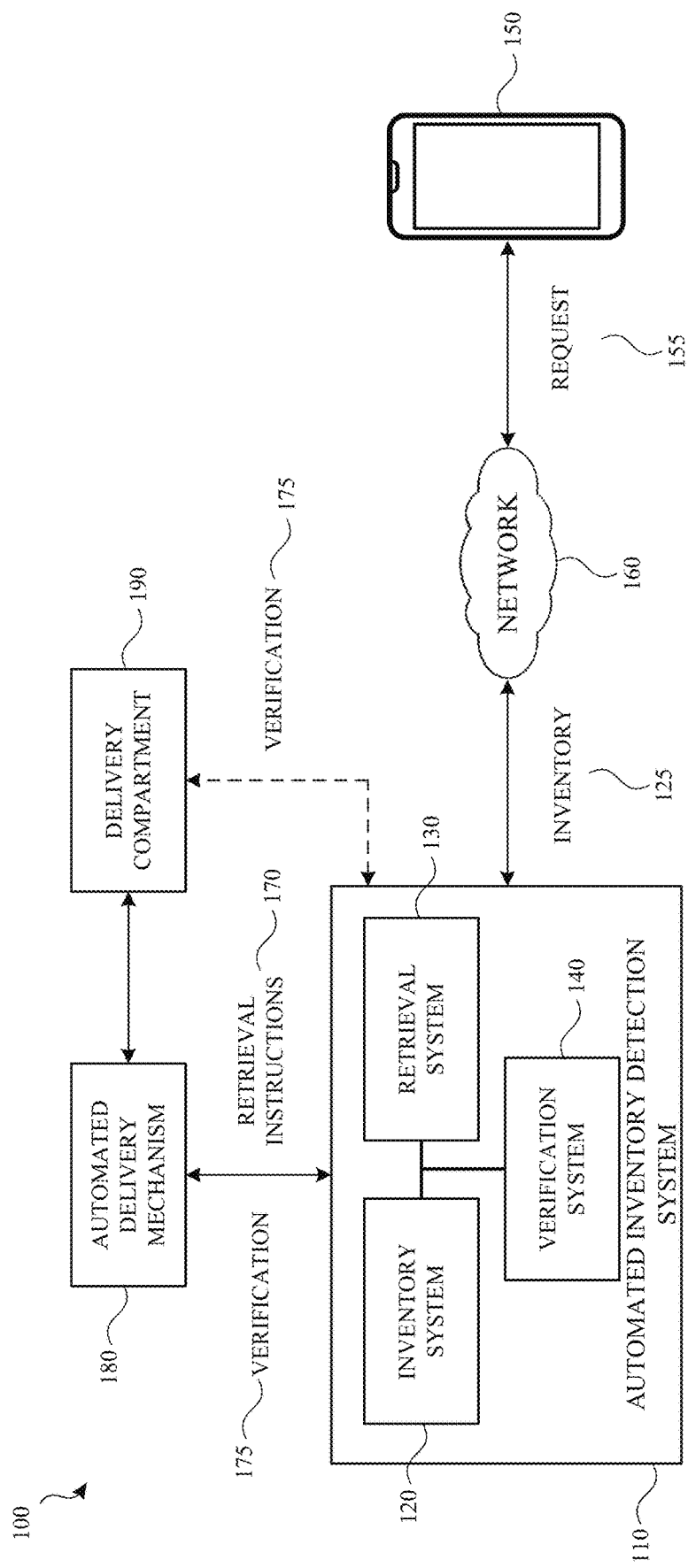
FIG. 1 illustrates an example system for enabling or providing contactless delivery of an item at a brick and mortar retail location according to one or more examples.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present application describes an automated inventory detection, retrieval and delivery system for traditional brick and mortar retail locations. In some examples, various components and systems of the automated inventory detection, retrieval and delivery system may be retrofitted to existing brick and mortar retail locations (also referred to herein a "retail store") and/or other locations such as apartment complexes, airports, train/subway stations, hotels, college campuses, hospitals and so on.

Additionally, the automated inventory detection, retrieval and delivery system may be substantially or completely autonomous. As such, individuals visiting traditional brick and mortar retail locations can avoid contact and/or interactions with other individuals due to pandemics, personal preferences or other reasons.

The automated inventory detection, retrieval and delivery system also tracks in real-time or substantially real-time, available inventory for various items in the brick and mortar retail location. Thus, when an individual accesses the system to order various items, the individual can know with a certainty that the particular item she ordered is available and may be picked up at her convenience. For example, the system described herein can use inventory information provided by the brick and mortar retail location to "know" what is currently available. As such, the system can correctly and accurately reserve and/or hold various items of inventory. For example, when the system or a component (e.g., an automated delivery mechanism) of the system described herein takes an item, the item is reserved for collection. Thus the item is still in inventory but is not available to sell at the present time.

In some examples, the various components and/or systems described may be provided in or otherwise integrated with existing retail storefronts. For example, a retailer may modify or replace a glass shop window or other surface (e.g., an outside wall) with a panel that enables consumers to interact with the automated inventory detection, retrieval and delivery system.

In some examples, the automated inventory detection, retrieval and delivery system allows individuals to purchase items provided by or otherwise available from the retail store without requiring the individual to enter the retail store. Additionally, the system and components described herein may be scalable such that the system may be retrofitted into any number of different sized retail stores. For example, the system may include a glass panel with a secure delivery compartment or compartments that may retrofit in to any existing retail store with a window or wall. Although a glass panel is specifically mentioned, this is for example purposes only and the panel may be made from any suitable material.

The concepts described herein eliminate aesthetic problems created by installation of an entire machine in a store window. Additionally, a retailer can stock and/or arrange shelves, tables, display cabinets etc. that are part of the automated inventory detection, retrieval and delivery system in a similar manner as the shelves, tables, display cabinets etc. that are in the rest of the retail store in order to retain a similar look and feel.

In some examples, the retrofitting allows products inside the retail store to be delivered to individuals outside the retail store and/or inside the retail store through the secure delivery compartments. Additionally, because some (if not all) of the various systems and components of the automated inventory detection, retrieval and delivery system are within the retail store, merchandise within the retail store may be safely and securely distributed to individuals outside of the retail store all day, every day with minimal or no staff.

In some examples, the automated inventory detection, retrieval and delivery system may include one or more automated doors mounted on a panel. The panel may be glass or may be other material suitable to secure a retail storefront. The secure delivery compartment may be accessed by an individual via the automated door. The automated door may be sized to be large enough for one or more items or products to pass through, yet not large enough for a person to climb through. In some examples, the automated inventory detection, retrieval and delivery system may include multiple automated doors of varying sizes. Thus, depending on the type of item purchased (e.g., large item versus small item) and/or the number of items purchased (e.g., one item versus five items) different automated doors and/or delivery compartments may be used. In such examples, the automated inventory detection, retrieval and delivery system may be able to determine which delivery compartments (and how many delivery compartments) may be needed to ensure the individual can access all of her items.

In some examples, the automated door may open vertically through a controlled motor or other actuation mechanism attached to the automated door. In some examples, a docking area for a robotic retrieval system (also referred to as an automated delivery system), which fetches products from retail shelves, may be positioned behind or otherwise associated with the automated door. When the robotic retrieval system is docked inside the retail store behind the glass window, the automated door may open allowing the individual to retrieve her product(s). In some examples, the robotic retrieval system must be docked before the automated door will open. In other examples, the robotic retrieval system does not need to be dockets but fulfills orders by placing items into a compartment, locker, or other receptacle for subsequent pick-up by the individual.

The automated inventory detection, retrieval and delivery system may also include a secure housing mounted behind one or more of the doors and/or at other secure locations within the retail store for preordered products to be stored temporarily until the individual arrives to collect her items. In some example, the automated door could be an automated parcel locker door and one or more of the doors in the automated parcel locker doors (and the associated locker) could be different sizes.

As discussed above, some or all of the various components and systems described herein may be installed in a retail store or may be part of a new build. In examples in which a retail store is retrofitted with the various components and systems described herein, the retailer may create an appropriate opening in an existing shop-front window, wall or door. The opening may be made within any material. In some examples, prefabricated panels in standard or custom sizes may be shipped allowing unskilled contractors to install the various components of the system in existing shop fronts.

In some examples, the delivery door and an associated delivery compartment may be securely mounted to the panel (e.g., a glass panel) and secured from the inside of the retail store. In some examples, the delivery door is made of the same material as the panel and the design is such that the mechanical components of the delivery door minimize any visual impact on the window of the retail store and/or on other parts of the retail store. For example, after the system is installed, the internal displays of the retail store may still be viewed from outside the retail store.

Using software systems described in U.S. Provisional Patent Application No. 62/724,465 (now U.S. application Ser. No. 16/556,109) and International Application PCT/US18/050524 (which are both hereby incorporated by reference) individuals can order items stored inside the retail store from a remote location or within the retail store itself. In the former example, when the individual arrives at the store, she can provide authentication information or other identifying information (using, for example, her mobile device, biometrics information such as facial recognition and fingerprints, a computer readable code, a PIN number or other such code and so on) and her order will be delivered or otherwise retrievable through the automated door. In some examples, the item(s) ordered by the individual will have been gathered by an automated delivery mechanism or robot associated with the automated inventory detection, retrieval and delivery system and placed in one or more delivery compartments prior to the individual arriving at the retail store or in response to a determination that the individuals is arriving or has arrived at the retail store. As such, delivery may occur once the individual arrives at the retail shop location.

In some example, the automated inventory detection, retrieval and delivery system may include a touch screen with peripheral payment devices (e.g., a credit card interface). Thus, individuals who did not preorder via a mobile device or other remote computing device, can shop the store without having to physically enter the store. This allows all-day operation without staff and allows walk-up purchases any time of the day or night.

In light of the above, an application for a mobile device may provide a shopping experience on the mobile phone that is similar or identical to the shopping experience on the touch screen. For example, consumers may select products, create a shopping cart, and checkout. Once items are selected, either at the touchscreen and/or on the application, the items may be fetched by the automated delivery mechanism inside the store and delivered through the automated door.

In some examples, a glass panel houses the automated door. As such, when the automated door is closed in may look substantially identical to an existing shop-front window. However, as indicated above, automated the door may be opened to allow goods to pass from inside the store to the outside.

As briefly discussed above, delivery of items may be made by a delivery system such as a robot or other such automated delivery mechanism. The automated delivery mechanism may dock inside the retail store behind the delivery door. In such examples, the robot may include a housing that enables the products to be delivered. The housing may be dimensioned and positioned such that, when the robot is docked, consumers cannot reach inside the store, but can open the delivery door and reach inside the delivery compartment to retrieve the items they've purchased. In some examples, the automated door may be programed such that it does not open unless it is secured by the robot. Although a robot is mentioned, one or more delivery compartments and/or orders may be fulfilled by a human worker if needed. Additionally, a human worker may be used to periodically verify whether the orders are completed accurately and timely.

In some examples, the system may allow consumers to pre-order items (e.g., order items before arriving at the retail store and/or order items prior to a release date, when the items are back in stock, etc.). When orders are received and/or when sufficient inventory to fulfill an order exists, the system causes the robot to deliver the items into one or more delivery compartments. In some examples, items from the same order may be placed in the same delivery compartment or in different delivery compartments. In some examples, these orders may be fulfilled by the system between orders that occurring in real-time (e.g., those that are occurring on premises such as at the retail store). Once the individual that submitted the pre-order is on her to the retail store or has provided some type of verification information, the individual may retrieve her order from the delivery compartment.

In yet other examples, retail shelves with products are visible from outside the retail store and/or inside the retail store. As briefly described above, the automated delivery mechanism includes an autonomous robot that picks items off retail shelves and docks with the automated door to deliver to consumers outside the store. In some examples, the ordered items may be delivered to individuals from inside the store to the outside of the store through the automated door or directly from the robot to the individual—regardless of whether the individual is inside or outside of the retail store. In some examples, the automated door may be provided on the retail store at a drive-through location.

In some examples, the system may be adapted for refrigeration to support delivery of food and beverage products. For example, the room or part of the housing the robotic delivery system may be refrigerated, the delivery compartment door may be sealed to prevent temperature loss. Likewise, aspects of the system may be adapted for heating to support delivery of food and beverage products. For example, the room or part of the housing the robotic delivery system may be insulated, the delivery compartment door may be sealed to prevent heat loss, and locker compartments may be insulated or heated or both, to maintain the temperature or increase the temperature of food that is intended to be served hot.

In yet other examples, an interface and software may allow a courier or other third party to collect items from the secure delivery compartment on behalf of an individual. In such examples, the system may include or otherwise provide tracking information for tracking the courier-collected items from the time they are collected at the retail store to when they are delivered to the individual.

In the examples described herein, the automated inventory detection, retrieval and delivery system may enable a consumer to enter the retail store to purchase items from a variety of robotic stores, vending machines, or self-service open shelves with sensors. In such examples, the entry of the individual into the automated store is controlled by a secure entry door, which may be opened upon the consumer identifying themselves as discussed above.

FIG. 1 illustrates an example automated inventory detection, retrieval and delivery system 100 for enabling or providing contactless delivery of an item at a brick and mortar retail location according to one or more examples. As described above, one or more components and/or systems described herein may be configured for retrofitting at an existing brick and mortar retail location. Although a brick and mortar retail location are specifically mentioned, the various components and systems described may be provided or otherwise integrated with a number of different buildings, structures, locations etc. In yet other examples, the automated inventory detection, retrieval and delivery system 100 may be a stand-alone system (e.g., not part of or separate from an existing brick and mortar retail location).

The automated inventory detection, retrieval and delivery system 100 may include an automated inventory detection system 110. The automated inventory detection system 100 is able to track in real-time or substantially real-time, available inventory of various items even when the various items have been sold or reserved but are still physically available (e.g., have not left or have not yet been picked up from the brick and mortar retail store). Thus, as various individuals access an inventory provided by the automated inventory detection, retrieval and delivery system 100, each individual may know in real-time or substantially real-time what items are and are not available. Additionally, unlike traditional brick and mortar retail stores, the real-time accountability of items (and the placement of those items on shelves that are accessible by the automated delivery mechanism) of the present system prevents situations in which an item is shown "in stock" but is either incorrectly represented as "in stock" or has been physically placed in a different location from where it should be placed, and as such, is not locatable. For example, in a traditional brick and mortar retail store, an individual may pick up an item intending to purchase the item but change his mind and place the item on a different shelf or location. Thus, although the item may technically in stock, the item may be difficult to locate.

In some example, the automated inventory detection system 110 may receive a request 155 from a computing device 150. The request 155 may be a request for items that are available from the automated inventory detection, retrieval and delivery system 100. The request 155 may also be an item request in which the individual operating or otherwise associated with the computing device 150 orders or pre-orders one or more items from the automated inventory detection, retrieval and delivery system 100.

In some examples, the request 155 is provided to the automated inventory detection, retrieval and delivery system 100 over a network 160 or other communication channel. In some examples, the computing device 150 may be a mobile phone, tablet, gaming console, television, streaming device, personal computer, laptop computer, smart watch, smart glasses, or other such computing device. In other examples, the computing device 150 may be integrated/associated with and/or physically located at the brick and mortar retail store. For example, the computing device 150 may be or otherwise include a touchscreen display provided at or near the automated inventory detection, retrieval and delivery system 100. In some examples, the request 155 may be sent or otherwise associated with an application executing on the computing device 150.

Once the request 155 is received by the automated inventory detection system 110, an inventory system 120 determines the inventory information 125 associated with the various items that are available for purchase. The inventory information 125 may include properties of the various items including, but not limited to a quantity of each item, a price of each item, available colors, available sizes and so on. Once determined, the automated inventory detection system 110 returns, via the network 160, inventory information 125 to the computing device 150. In some examples, the inventory system 120 may provide updates to the inventory information 125 in real-time or substantially real-time. Thus, as other individuals and/or computing devices access the automated inventory detection, retrieval and delivery system 100 and purchase items or pre-order items, the inventory information 125 may be provided to the computing device 150 such that the individual knows what items are and are not currently available.

Once the inventory information 125 is provided to the computing device 150, the individual may select one or more available items for purchase. This request (also shown and referred to as request 155) may be provided to the automated inventory detection system 110. In response to receiving the request 155, a retrieval system 130 of the automated inventory detection system 110 may cause or otherwise provide retrieval instructions 170 to an automated delivery mechanism 180 to retrieve the one or more items. In some examples, once the retrieval instructions 170 are provided to the automated delivery mechanism 180, the inventory system 120 updates the inventory information 125 associated with the item.

For example, if the request 155 indicates the individual operating the computing device 150 has selected a blue widget for purchase and the retrieval system 130 provides retrieval instructions 170 to the automated delivery mechanism 180, the inventory system 120 may be instructed to update inventory information 125 associated with the stock of widgets and/or blue widgets. Thus, if and when additional individuals access the automated inventory detection, retrieval and delivery system 100 to purchase widgets (or other items) those individuals are confident that the inventory information 125 they receive is accurate.

In some examples, the inventory system 120 may update the inventory information 125 prior to or substantially simultaneously with the automated delivery mechanism 180 receiving the retrieval instructions. Thus, if the automated delivery mechanism 180 is performing a different retrieval job for a different individual, the inventory is updated in real-time or substantially real-time.

Although a single automated delivery mechanism 180 is shown and described, the automated inventory detection, retrieval and delivery system 100 may include any number of automated delivery mechanisms 180. In such examples, each automated delivery mechanism may retrieve items for the same individual (e.g., in examples in which the individual has ordered multiple items) or may retrieve items for different individuals. In such examples, each of the automated delivery mechanisms 180 may communicate with each other to identify the item it is retrieving, thereby avoiding or preventing duplicative or unnecessary work. In either case, as each of the items are retrieved and/or ordered, the inventory system 120 may update the inventory information 125 of the item even if the item is still physically present in the retail store.

In some examples, when the automated delivery mechanism 180 retrieves the item, the item is placed in a delivery compartment 190. As explained above, the delivery compartment 190 may include or otherwise be associated with an automated door that enables an individual to access her items when the individual arrives at the brick and mortar retail location. In some examples, the delivery compartment 190 has or is otherwise associated with verification mechanism that verifies the identity of the individual and/or identifies whether the correct item (e.g., the item ordered by the individual) is placed within the delivery compartment.

In some examples, the automated delivery mechanism 180 may be enables to open a cabinet and/or lock/unlock a cabinet or shelf (e.g., a cabinet or shelf that holds jewelry, prescriptions or other medications, etc.) In some examples, the automated delivery mechanism 180 has a special verification token associated with the individual that verifies the individual has purchased and should access the locked item.

In some examples, a different verification mechanism may be used for each scenario. For example, a first verification mechanism (e.g., weigh sensor, scanner, image/object recognition mechanism etc.) may be used to verify that the automated delivery mechanism 180 placed the ordered widget(s) within the delivery compartment 190. Additionally, a second verification mechanism (e.g., an authentication mechanism) may be used to verify the identity of the individual that is attempting to retrieve the widget(s) from the delivery compartment 190.

In some examples, the first verification mechanism associated with the delivery compartment 190 may provide verification information 175 to a verification system 140 of the automated inventory detection system 110. Once the verification information 175 is received, it may be compared against the request 155 provided by the computing device 150. Although the automated delivery mechanism is programmed to retrieve the correct item, this verification component may be included as an extra precaution.

In another example, the first verification mechanism may be a verification that the automated delivery mechanism 180 has picked up the item. For example, when an order is received for a blue widget with a certain SKU (or other identifier), the automated delivery mechanism 180 provides the first verification mechanism to the system when that item is retrieved. However, in some examples, automated delivery mechanism 180 may or may not need to initially verify that the item is retrieved. For example, the automated delivery mechanism 180 may use computer vision, sensors, scanners or the like to identify a code (or other information) in a known shelf location to validate the correct item. In other examples, the item may be provided to the automated delivery mechanism 180 by a human. Thus, when the automated delivery mechanism has the item in transit, the item is secured and the system "knows" the correct item has been collected.

When the automated delivery system 180 deposits the item in the delivery compartment 190, the item being deposited is the correct item. In some examples, the delivery compartment 190 may have similar barcode scanners, CV or weight sensors, sensors, vision systems etc. to verify items. In some examples, the individual that retrieves the items from the delivery compartment 190 may provide verification that the fulfilled order was correct/complete.

The second verification mechanism associated with the delivery compartment 190 may be used to verify the identity of the individual associated with the request 155. The verification mechanism may be configured to verify biometric information associated with the individual, a computer-readable code provided to the computing device 150 associated with the individual, a PIN number provided to or associated with the individual, and so on. In some examples, the individual may designate a third party or courier to pick up the items on behalf of the individual. In such example, the verification system 140 may be configured to verify the third party on behalf of the individual.

In some examples, the delivery compartment 190 may be accessible to a robotic pick-up device that is programmed to pick-up various items and subsequently deliver the items to the individual. In another example, a third party can access the delivery compartment 190 and provide the items to the robotic pick-up device which then subsequently delivers the items to the individual.

Once the identity of the individual has been verified by the verification system 140, the delivery compartment 190 may be accessed by the individual and the individual may remove the purchased items. Once the items have been removed from the delivery compartment 190, the inventory system 120 receives a verification 175 that purchased items are no longer physically present at the brick and mortar retail location. As such, the inventory information 125 associated with those items may be confirmed.

Likewise, it is anticipated that an individual may change her mind and/or return an item. As such, the individual may put the item back or replace the item within the delivery compartment 190. In such examples, the delivery compartment 190 and/or the automated delivery mechanism 180 may verify (e.g., using various sensors and/or information described above) that the item is authentic/legitimate (e.g., the user did not place an empty box or a different item in the delivery compartment 190). Once the item or items have been verified, inventory information 125 associated with the item(s) is updated by the inventory system 120.

In some example, the automated delivery mechanism 180 may be configured to select one or more delivery compartments 190 from a plurality of available delivery compartments 190 based on a request 155 and/or on inventory information 125. For example, if the request includes a purchase of multiple items, the automated delivery mechanism 180 may determine size requirements (or other requirements) for the items and intelligently select a delivery compartment that can collectively house/store the items until the individual arrives to pick up the items.

In another example, the automated inventory detection system 110 may send retrieval instructions 170 to one or more of the automated delivery mechanisms 180 in response to information provided by the computing device 150. This information may include location information, time and date pick-up information, payment information etc. For example, the individual may indicate a pick-up time and/or date for her items. As the time and/or date approaches or arrives, the automated inventory detection system 110 may provide retrieval instructions 170 for those items such as previously described.

In other examples, the information may be or otherwise include location information. Thus, the automated inventory detection system 110 may only provide retrieval instructions 170 to the automated delivery mechanism 180 when location information indicates the individual is moving toward a determined or known location of the brick and mortar retail location, is within a predetermined distance of the brick and mortar retail location, is within a predetermined arrival time to the brick and mortar retail location (e.g., five minutes from the brick and mortar retail location), and/or has physically arrived at the brick and mortar retail location.

In some examples, the automated inventory detection system 110 may consider a number of factors when determining when to send retrieval instructions 170 to the automated delivery mechanism. These factors may be included with or separate from the information described above. For example, these factors may include the time of the day or day of the week (e.g., some times of the day and/or days of the week may be busier than others), an anticipated or determined time required by the automated delivery mechanism 180 to collect the items (e.g., ten minutes) and other such factors.

Figure 2:
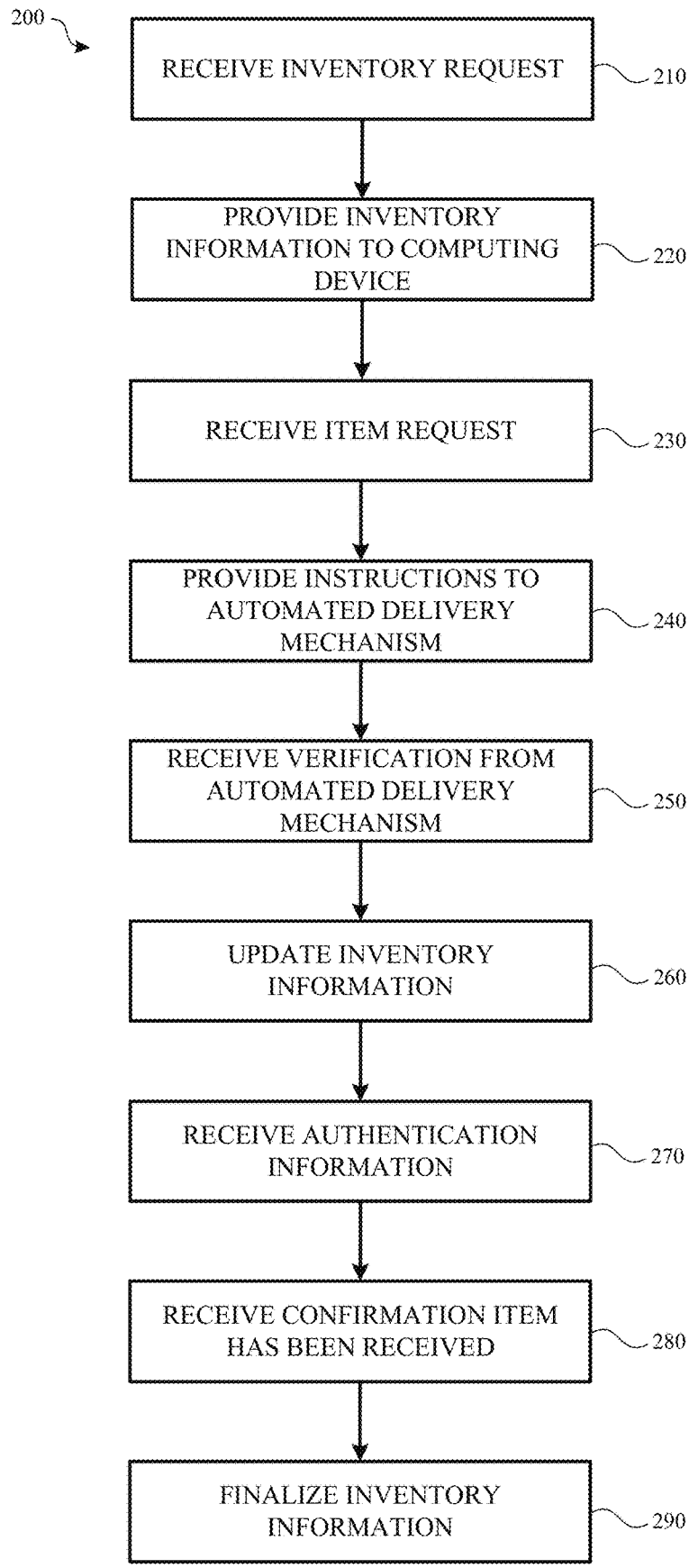
FIG. 2 illustrates an example method for providing contactless delivery of an item at a brick and mortar retail location according to one or more examples.

FIG. 2 illustrates an example method 200 for providing contactless delivery of an item at a brick and mortar retail location according to one or more examples. In some examples, the method 200 may be performed by one or more components and/or system shown and described with respect to FIG. 1.

Method 200 begins when an inventory request is received (210) by an automated inventory detection, retrieval and delivery system such as, for example, automated inventory detection, retrieval and delivery system 100 shown in FIG. 1. The inventory request may be received from a remote computing device or may be received from a computing device located in or otherwise associated with the brick and mortar retail location.

In response to receiving the request, the automated inventory detection, retrieval and delivery system may provide (220) inventory information to the requesting computing device. As indicated above, the inventory information may be provided to the requesting computing device in real-time or substantially real-time. Thus, a user of the computing device may have current and up to date information regarding all of the items that are currently available at the brick and mortar retail location.

The automated inventory detection, retrieval and delivery system may also receive (230) an item request from a computing device. For example, the user operating or otherwise associated with the computing device may select one or more items for reservation and/or purchase from the provided inventory information. In some examples, the request is provided to the automated inventory detection, retrieval and delivery system each time a selection for an item is made. For example, if the individual selects a blue widget for purchase and the blue widget is added to her shopping cart, the automated inventory detection, retrieval and delivery system immediately or substantially immediately, updates the inventory information associated with blue widgets (or a more general category of widgets). In other examples, the inventory information is not updated until the individual has completed purchase or otherwise indicated she is purchasing or will purchase the item(s).

When the item request is received (or when the individual has or is beginning a check out process which may include providing payment or partial payment for the items), the automated inventory detection, retrieval and delivery system provides (240) retrieval instructions to an automated retrieval mechanism. The retrieval instructions cause the automated retrieval mechanism to gather the requested items and place the requested items in a delivery compartment. In some examples, the automated retrieval mechanism is a robot or other mechanism that may be integrated with the brick and mortar retail location or may be free to roam/travel around/within the brick and mortar retail location.

As the items are being gathered by the automated delivery mechanism, the automated delivery mechanism and/or the delivery compartment may be configured to receive and/or provide (250) verification information associated with the item to/from the automated inventory detection, retrieval and delivery system. For example, as an item is placed in the delivery compartment, the verification information may be used to verify whether the item that is placed in the delivery compartment is the correct item (e.g., the item the individual ordered). In some examples, this may also include verifying the number of items, the properties of the item(s), the size of item(s) (e.g., to ensure the item fits within the delivery compartment and/or can be removed from the delivery compartment due to a size of an associated automated door), and so on.

The automated inventory detection, retrieval and delivery system may also update (260) inventory information as an item is being retrieved by the automated delivery mechanism and/or as the item is being placed into the delivery compartment. As discussed above, the inventory information is updated in real-time or substantially real-time.

As the individual arrives to retrieve her items, the automated inventory detection, retrieval and delivery system receives (270) authentication information to verify the identity of the individual such as previously described. When the individual is authenticated, the delivery compartment may be accessed by the individual and the individual may remove the item.

The automated inventory detection, retrieval and delivery system may also receive (280) confirmation that item has been removed from the delivery container. In such circumstances, the automated inventory detection, retrieval and delivery system may finalize (290) the inventory information. For example, once the automated inventory detection, retrieval and delivery system has determined the individual has removed the item from the delivery compartment, the automated inventory detection, retrieval and delivery system will confirm the inventory information no longer includes the item (e.g., the item is no longer physically located at the brick and mortar retail location).

In some example, the individual may remove the item from the delivery container and then replace the item, thereby indicating the individual changed her mind, the item was inadvertently ordered or for some other reason. In such examples, the automated inventory detection, retrieval and delivery system may update inventory information associated with the item to indicate the item is again available for purchase. The automated delivery mechanism may then replace the item it is original location on a shelf.

In other examples, the automated inventory detection, retrieval and delivery system may cause or otherwise instruct the automated delivery mechanism to replace non-retrieved items and/or update inventory information associated with one or more items once a predetermined period of time has passed. For example, if an individual has ordered an item (or placed an item in her shopping cart) but has not picked up the item (or, in the later example, purchased the item) within a predetermined time period, the automated delivery mechanism may remove the item from the delivery compartment and/or the system may update the inventory information accordingly.

Figure 3A:
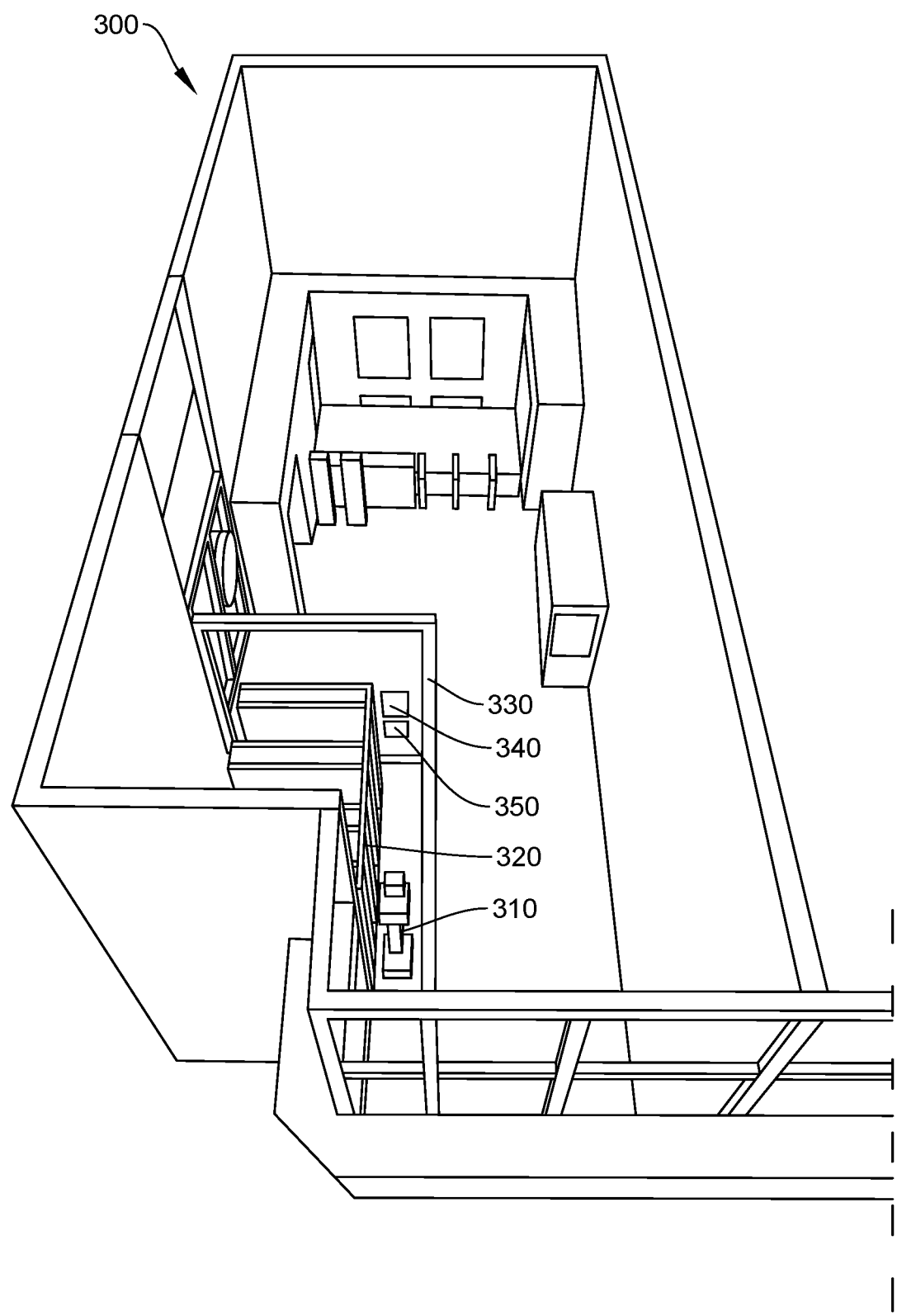
FIGS. 3A-3C illustrate an example contactless delivery system that has been retrofit into an existing brick and mortar retail location according to one or more examples.
Figure 3B:
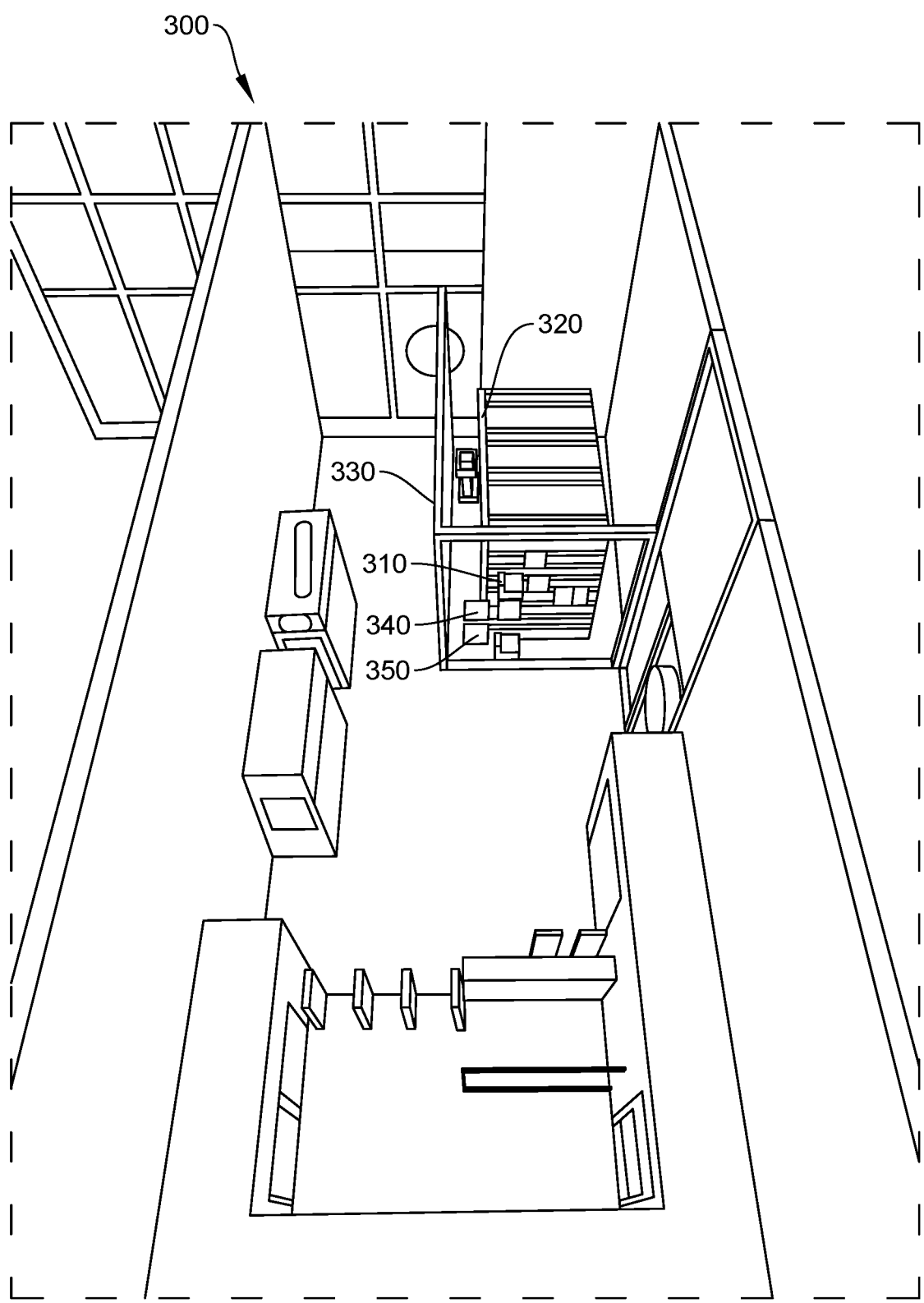
Figure 3C:
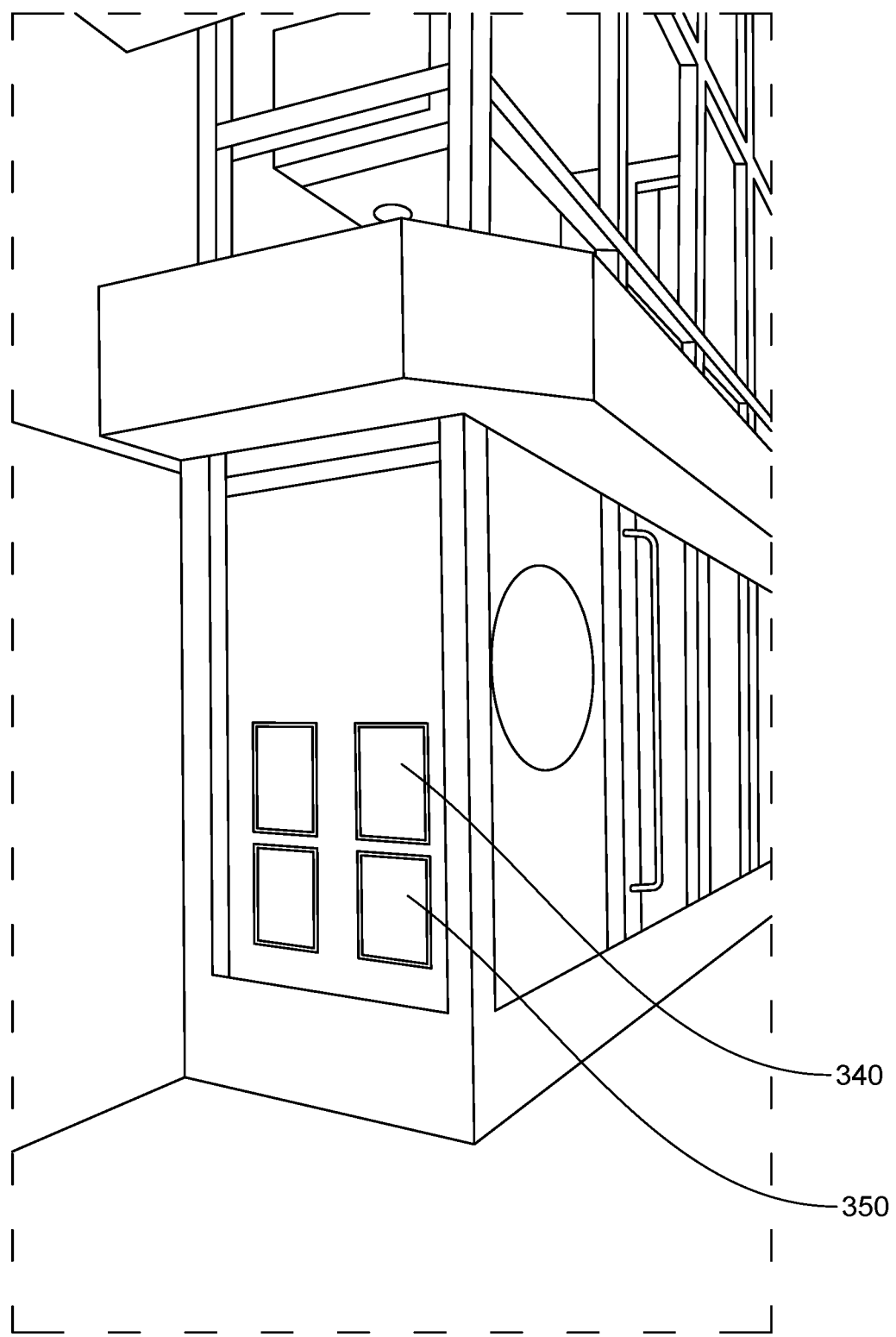

FIGS. 3A-3C illustrate an example contactless delivery system 300 that has been retrofit into an existing brick and mortar retail location according to one or more examples. The contactless delivery system 300 may include one or more components and systems of the automated inventory detection, retrieval and delivery system 100 shown and described with respect to FIG. 1.

For example, the contactless delivery system 300 may include an automated delivery mechanism 310. The automated delivery mechanism 310 may be enclosed or otherwise secured within an area defined by one or more boarders 330. In some examples, the one or more boarders 330 may be glass, plastic or other suitable transparent (or opaque) material. As described above, the boarders may be windows, walls or the like and may be added/retrofit to an existing brick and mortar retail location.

The area also includes one or more shelves 320 or other structures on which a number of items are available for purchase are placed. Thus, when an order is received, the automated delivery mechanism 310 may retrieve the item from a shelf 320 and place the item in a delivery container 350. In some examples and as described above, the contactless delivery system 300 may also be associated with or otherwise include a computing device 340. The computing device may enable the individual to purchase and retrieve an item when the individual is located within the brick and mortar retail location. In other examples, the computing device may be a remote computing device such as previously described.

FIG. 3B illustrates another view of the contactless delivery system 300 according to an example. As shown, the contactless delivery system 300 may include multiple computing devices 340 and/or multiple delivery compartments 350. In some examples, a single automated delivery mechanism 310 may service all of the deliver compartments 350. In other examples, multiple automated delivery mechanisms 310 may be present in order to provide item retrieval for multiple individuals simultaneously or substantially simultaneously—including individuals that are within the brick and mortar retail location and those individuals that are ordering items from a remote computing device.

FIG. 3C illustrates an outside wall of the brick and mortar retail location. As shown in FIG. 3C, the contactless delivery system 300 may include multiple computing devices 340 and/or multiple delivery compartments 350 on an outside wall. Thus, the brick and mortar retail location may sell items to various individuals every day during all hours of the day. In some examples, the computing devices 340 and the delivery compartments 350 may be retrofit into an existing window and/or wall of the brick and mortar retail location.

Figure 4:
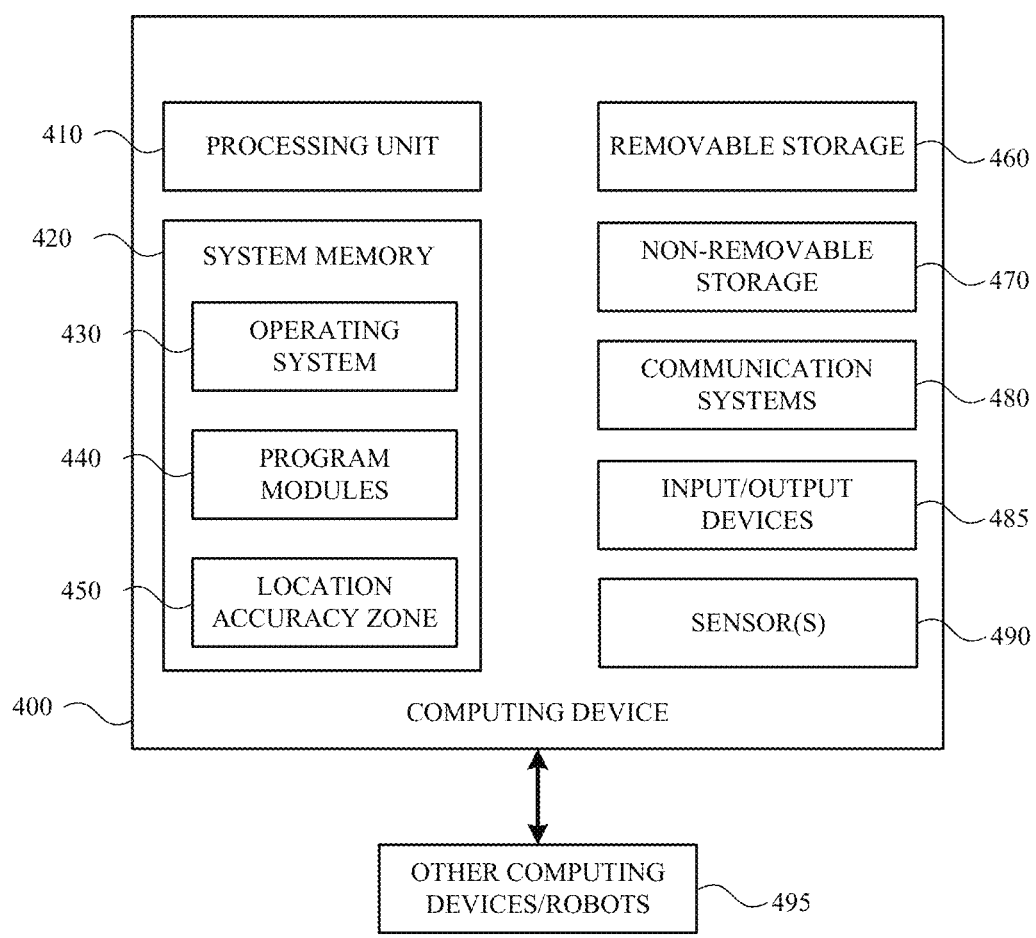
FIG. 4 is a block diagram of an example computing device that may be integrated with or part of the various systems described herein according to one or more examples.

FIG. 4 is a system diagram of a computing device 400 according to an example.

The computing device 400, or various components and systems of the computing device 400, may be integrated or associated with a network-access device such as described herein. As shown in FIG. 4, the physical components (e.g., hardware) of the computing device are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for gathering or determining authentication details of individuals, providing instructions to the automated delivery mechanism, providing inventory updates and so on. The memory 420 may also store and/or provide access credentials, payment information associated with an individual, and/or inventory information such as described above. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495, robots, and/or other automated inventory detection, retrieval and delivery systems, vending machines etc. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for contactless delivery of an item at a brick and mortar retail location, comprising:
    receiving, from a computing device, a request for an item, the item being physically located within the brick and mortar retail location;
    in response to receiving the request for the item, causing a robotic delivery system associated with the brick and mortar retail location to retrieve the item;
    causing the robotic delivery system to place the item in a delivery compartment at the brick and mortar retail location;
    once the item is placed in the delivery compartment, automatically updating, in substantially real-time, inventory information associated with the item, the inventory information indicating the item is no longer available even though the item is physically located in the delivery compartment at the brick and mortar retail location;
    receiving, from the computing device, a request for a second item;
    causing the robotic delivery system to place the second item in the delivery compartment with the item;
    automatically updating, in substantially real-time, inventory information associated with the second item, the inventory information indicating the second item is no longer available even though the second item is physically located in the delivery compartment;
    receiving, from the computing device, authentication information verifying an identity of an individual associated with the request;
    in response to receiving the authentication information, releasing the item and the second item from the delivery compartment to the individual; and
    verifying the inventory information associated with the item or the second item in response to the item or the second item being removed by the individual from the delivery compartment.

2. The method of claim 1, wherein causing the robotic delivery system to place the item in the delivery compartment comprises causing the robotic delivery system to place the item in the delivery compartment in response to received location information associated with the computing device.

3. The method of claim 1, further comprising detecting that the item has been replaced into the delivery compartment.

4. The method of claim 3, further comprising updating the inventory information associated with the item in response to the item being replaced into the delivery compartment.

5. The method of claim 1, wherein the delivery compartment is accessible on an outer wall of the brick and mortar retail location.

6. The method of claim 1, wherein the computing device is a remote computing device.

7. The method of claim 1, wherein the computing device is associated with the brick and mortar retail location.

8. A system, comprising:
    a processor; and
    a memory coupled to the processor and storing instructions that, when executed by the processor, perform operations, comprising:
        receiving, from a computing device, a request for an item, the item being physically located within the brick and mortar retail location;
        in response to receiving the request for the item, causing a robotic delivery system associated with the brick and mortar retail location to retrieve the item;
        causing the robotic delivery system to place the item in a secure delivery compartment at the brick and mortar retail location;
        in response to the robotic delivery system retrieving the item or placing the item in the secure delivery compartment, automatically updating, in substantially real-time, inventory information associated with the item, the inventory information indicating the item is no longer available for purchase even though the item is physically located in the secure delivery compartment at the brick and mortar retail location;
        receiving, from the computing device, a request for a second item;
        causing the robotic delivery system to place the second item in the secure delivery compartment with the item;
        automatically updating, in substantially real-time, inventory information associated with the second item, the inventory information indicating the second item is no longer available even though the second item is physically located in the secure delivery compartment;
        receiving, from the computing device, authentication information verifying an identity of an individual associated with the request;
        in response to receiving the authentication information, releasing the item and the second item to the individual from the secure delivery compartment; and
        verifying the inventory information associated with the item or the second item in response to the item or the second item being removed by the individual from the delivery compartment.

9. The system of claim 8, wherein causing the robotic delivery system to place the item in the secure delivery compartment comprises instructions for causing the robotic delivery system to place the item in the secure delivery compartment in response to received location information associated with the computing device.

10. The system of claim 8, further comprising instructions for determining whether the item has been removed from the secure delivery compartment.

11. The system of claim 10, further comprising instructions for updating the inventory information associated with the item in response to determining the item has not been removed from the secure delivery compartment.

12. The system of claim 8, wherein the secure delivery compartment is accessible on an outer wall of the brick and mortar retail location.

13. The system of claim 8, wherein the secure delivery compartment is accessible within the brick and mortar retail location.

14. The system of claim 8 wherein the secure delivery compartment is accessible on surface that that has been retrofit within brick and mortar retail location.

15. The system of claim 8, wherein the computing device is a remote computing device.

16. The system of claim 8, wherein the computing device is associated with the brick and mortar retail location.

17. A system, comprising:
a processor; and
a memory coupled to the processor and storing instructions that, when executed by the processor, perform operations, comprising:
storing inventory information associated with an item physically available at a brick and mortar retail location;
receiving a request for the item;
causing a robotic delivery system associated with the brick and mortar retail location to retrieve the item;
causing the robotic delivery system to place the item in a secure delivery compartment associated with the brick and mortar retail location;
once the item is placed in the secure delivery compartment, automatically updating, in substantially real-time, the inventory information associated with the item, the inventory information indicating the item is no longer available for purchase even though the item is physically located within the brick and mortar retail location;
receiving a request for a second item;
causing the robotic delivery system to place the second item in the secure delivery compartment with the item;
once the second item is placed in the secure delivery compartment, automatically updating, in substantially real-time, the inventory information associated with the second item, the inventory information indicating the second item is no longer available for purchase even though the second item is physically located within the brick and mortar retail location;
receiving authentication information verifying an identity of an individual associated with the request;
in response to receiving the authentication information, permitting access to the secure delivery compartment; and
verifying the inventory information associated with the item or the second item in response to the item or the second item being removed from the secure delivery compartment.

18. The system of claim 17, wherein the secure delivery compartment is posited on an outside wall associated with the brick and mortar retail location.

* * * * *